US006550428B2

(12) United States Patent
Betzen

(10) Patent No.: US 6,550,428 B2
(45) Date of Patent: *Apr. 22, 2003

(54) ELECTRODE CONFIGURATION FOR DEER REPELLENT DEVICE

(76) Inventor: Keith M. Betzen, P.O. Box 5604, Unionville, IN (US) 47407

(\*) Notice: Subject to any disclaimer, the term of this patent is extended or adjusted under 35 U.S.C. 154(b) by 0 days.

This patent is subject to a terminal disclaimer.

(21) Appl. No.: 09/835,610

(22) Filed: Apr. 16, 2001

(65) Prior Publication Data

US 2002/0148413 A1 Oct. 17, 2002

(51) Int. Cl.[7] .............................................. A01K 37/00
(52) U.S. Cl. ...................................................... 119/712
(58) Field of Search .......................................... 119/712

(56) References Cited

U.S. PATENT DOCUMENTS

| 922,377 A | 5/1909 | Ames | |
| 4,630,571 A | 12/1986 | Palmar | 119/29 |
| 5,894,818 A | 4/1999 | Betzen | 119/712 |
| 6,014,951 A | 1/2000 | Betzen | 119/712 |

FOREIGN PATENT DOCUMENTS

| CH | 82560 | 3/1919 |
| FR | 440270 | 2/1912 |

OTHER PUBLICATIONS

Engineering drawing showing semi-circular electrodes Betzen Mfg. P.O. Box 5604 Bloomington IN 47407.

Primary Examiner—Charles T. Jordan
Assistant Examiner—Jordan Lofdahl

(57) ABSTRACT

In order to deter deer from a protected area, a baited, shock-producing deer repellent device is provided having an improved electrode configuration with the bare wire alternating positive and negative electrodes being substantially semicircular in shape and with the electrodes being variously sized and arranged to form an approximate hemisphere and with the electrodes being substantially parallel and substantially equidistant from each other. This configuration provides an approximately even chance that a deer will make contact with a positive and a negative electrode simultaneously, regardless of the angle or direction of the deer's approach, or of the size of the deer.

2 Claims, 1 Drawing Sheet

ELECTRODE CONFIGURATION FOR DEER REPELLENT DEVICE

FIELD OF THE INVENTION

This invention relates to shock-producing, animal repelling and training devices; particularly to a baited, shock-producing, deer repelling and training device which has electrodes that are shaped and spaced to increase the chances that a deer will make contact with a positive and negative electrode simultaneously.

BACKGROUND OF THE INVENTION

Various electrode configurations have been described for portable, shock-producing, animal deterrent devices.

U.S. Pat. No. 922,377 to Ames (1909), French Patent 440,270 to Calvert (1912) and Swiss Patent 82,560 to Baumann (1919), show small animal extermination devices with the electrodes being arranged essentially in the same plane.

U.S. Pat. No. 4,630,571 to Palmer (1986) shows an animal training device with the outer conductive case of the device being one electrode and the stake to the earth being the other.

U.S. Pat. No. 5,894,818 to Betzen (1999) describes a baited, shock-producing, deer repelling and training device in which the deterrent voltage maintained across the electrodes is stored in a capacitor. The electrodes of the device described by Betzen (1999) are short projections above the surface of the device.

An electrode configuration for use in a device for a large animal, such as a deer, must protect the bait from an approach from the top. None of these prior art devices provide an electrode configuration which protects the bait from an approach from the top.

Subsequent prototypes and commercial models of a deer repellent device using the power system described by Betzen (1999) have used two crisscrossing semicircular, bare wire electrodes which describe a hemisphere which surrounds the scent dispenser to protect it from an approach from the top. U.S. Pat. No. 6,014,951 to Betzen (2000) shows a crisscrossing electrode configuration designed to protect the bait from an approach from virtually any direction, consisting of a positive, circular electrode and a negative, circular electrode which are opposed at ninety degrees and which describe a sphere which encloses the attractant dispenser.

These crisscrossing configurations of electrodes have proven to be effective, but a problem has become evident with this electrode configuration which has not allowed this type of device to perform to its full potential. In order for this type of device to deliver a shock, a deer must contact both a positive and a negative electrode simultaneously. With crisscrossing electrodes, the chances that a deer will contact two electrodes is greater near the top and lower at the sides of the device where the electrodes are further apart. It has been observed that an occasional deer will touch the side of the device, touching only one electrode, and not receive a shock. When this happens the deer learns both that the device is not good to eat, despite how it smells, and, that the device is not harmful. Therefore the deer will not touch the device again and it will have no reason to be afraid of the area, rendering the device and the method ineffectual for that particular deer. This is especially a problem with fawns. Since their noses are smaller, fawns have an increased chance of not contacting both electrodes if they touch the sides of the device where the electrodes are further apart. Also, since fawns are shorter, they are more likely to touch the device on the side.

To be most effective on this type of deer repellent device, the bare wire electrodes must be shaped and spaced such that they provide a near even chance that a deer will contact a positive and a negative electrode simultaneously, regardless of the angle or direction of the deer's approach or the size of the deer. None of these prior art devices provide such an electrode configuration.

SUMMARY OF THE INVENTION

It is evident that all of the prior art devices disclosed herein suffer from disadvantages which limit their efficiency.

Accordingly, the objects and features of the device of the present invention are described subsequently which eliminate problems associated with the prior art devices.

A principal object of the present invention is to provide an electrode configuration for a baited, shock-producing deer repellent device which has the alternating positive and negative electrodes being shaped and spaced such that they are substantially parallel and have a substantially constant distance between them, and with this electrode arrangement functioning to provide an approximately even chance that a deer will make contact with a positive and a negative electrode simultaneously, regardless of the angle or direction of the deer's approach, or of the size of the deer.

A principal object of the present invention is to provide a substantially hemispherical electrode configuration for a baited, shock-producing deer repellent device, which has alternating positive and negative electrodes being substantially semicircular shaped and with the semicircular electrodes being appropriately sized and being arranged with the flat plane of the semicircle being vertical, and being spaced to form an approximate hemisphere to enclose the attractant dispenser, and with the positive and negative electrodes being substantially parallel and equidistant from each other, and with this electrode arrangement functioning to provide an approximately even chance that a deer will make contact with a positive and a negative electrode simultaneously, regardless of the angle or direction of the deer's approach, or of the size of the deer.

Therefore, it can be seen that the combination of features incorporated into the device of the present invention solves problems associated with the prior art electrode configurations used on this type of deer repelling and training device. It can also be seen that the device of the present invention produces new and unobvious results that have not been produced by the prior art.

Additional features will become apparent from a consideration of the ensuing drawings and description.

DESCRIPTION OF THE PREFERRED EMBODIMENTS

There are various electrode configurations possible in which the positive and the negative electrodes will be substantially parallel have a substantially constant distance between them. Circular electrodes, which would make a spherical arrangement, or semicircular electrodes, which describe a hemisphere could be used in this type of device. For deer it has been found that a hemispherical configuration works very well if the device is not too tall. The relatively tall deer will approach a shorter device only from around the top and the sides, and there is no need to have the electrodes extend around the bottom side of the device. The preferred embodiment described herein provides a simple configuration of electrodes that provides an increased chance of contact.

Figure 1:
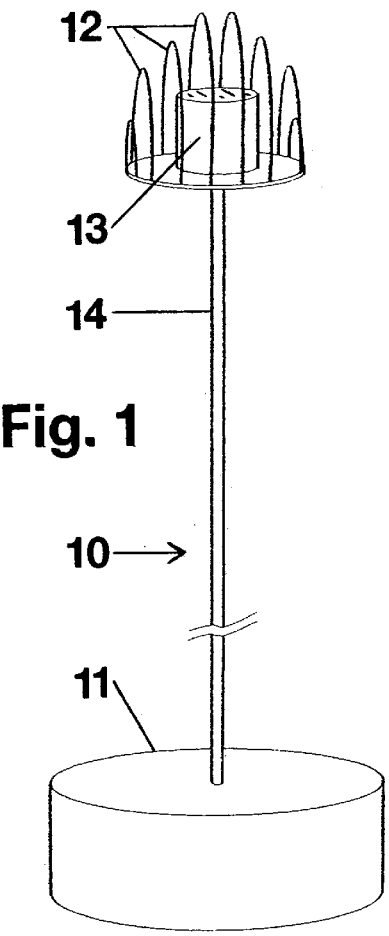
FIG. 1 shows a perspective view of a typical embodiment of the present invention.

FIG. 1 shows a typical embodiment of a portable, shock-producing, deer repellent device 10 which consists of a field unit with a protective housing 11 to contain the batteries and electronic components which maintain a predetermined voltage across the alternating positive and negative semicircular electrodes 12 which form a substantially hemispherical shape to enclose the attractant dispenser 13. Deer attracted to the scent will touch the electrodes 12 and receive an electric shock. The field unit has a stem and electrode support 13 to position and to support the components and to carry conductors connecting the electrodes to the power supply.

The electrodes are made from uninsulated 0.020" stainless steel wire. The diameter of the top piece is about 2 inches with the alternating positive and negative electrodes being about ¼ inch apart. The device is mostly made of plastic and is about 16–20 inches tall. The bait to draw the deer to touch the device is an attractant dispenser consisting of a polyester wick soaked with a perfumed oil that is an attractant for deer.

Figure 2:
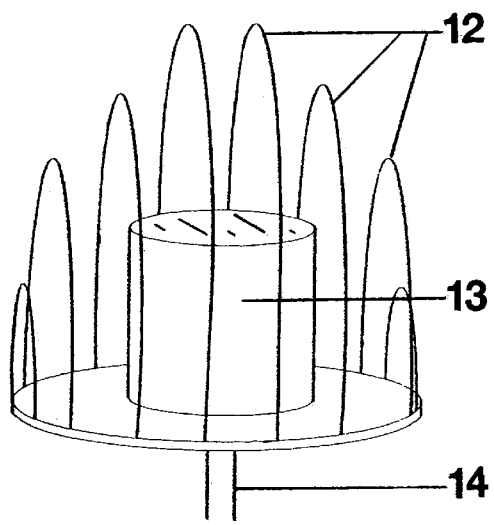
FIG. 2 shows a close-up view of the improved electrode configuration.

FIG. 2 shows a detailed view of the alternating positive and negative electrodes 12 which surround the attractant dispenser 13 and which are held in place by the stem and electrode support 14.

Figure 3:
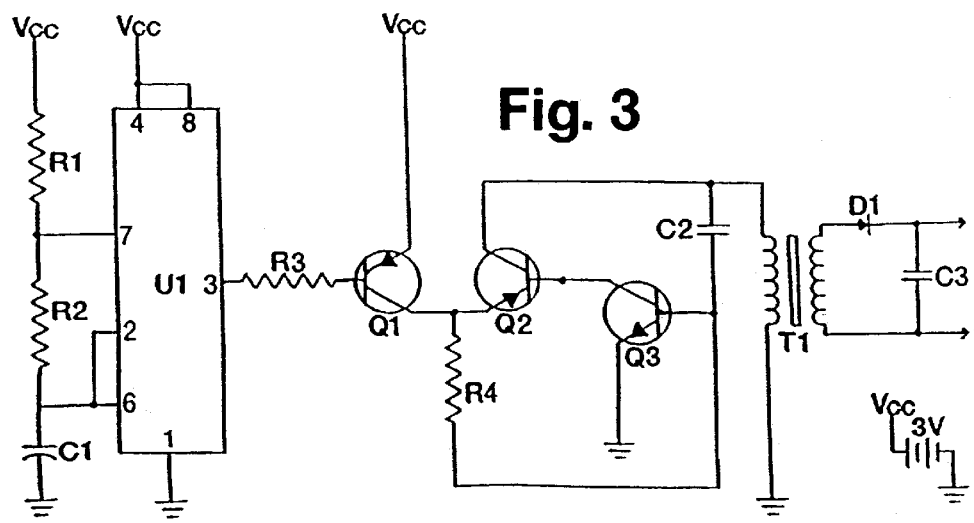
FIG. 3 shows a schematic drawing of a typical circuit used in the device.

FIG. 3 shows a schematic of a circuit that can be used to charge capacitor, C3, to about 360 volts when the battery voltage is about 3.1 volts and when transformer, T1, has a primary/secondary ratio of 1/138 with 27 primary windings. T1 has a 20 milliwatt power rating, a primary impedance of 8 ohms, and is operating in this circuit at 14 Khz. The values of the resistors are: R1=2.7M, R2=10K, R3=470 and R4=33K. The values of the capacitors are: C1=470 uf, 10 volt, electrolytic; C2=0.047 uf, 10 volt, ceramic; C3=1.5 uf, 400 volt, metalized polyester. The types of the transistors are: Q1 and Q2 are 2N2907 and Q3 is a 2N2222. The diode, D1, is a 1N4006. The timer, U1, is a ICM7555CN. The circuit shown in FIG. 3, with these component values will charge the capacitor for 3.26 seconds with an interval of 14.7 minutes between charging pulses. The charging time, the interval, the capacitance of C3 and the voltage to which C3 is charged are all variable and can be adjusted to each situation and species. The power supply for this circuit is 2 AA batteries in series. All components are ¼ watt, and all components are readily available, except the transformer, which is custom made for this application.

The description of the preferred embodiment of the present invention contained herein is an exemplification of typical embodiments and is considered as illustrative only of the principles of this invention. Although this description contains various specificities, these should not be construed as limitations on the scope of this invention. The preferred embodiment described herein is only one of various other possible configurations of electrodes which would enclose the attractant dispenser and have the alternating positive and negative electrodes being substantially parallel with a substantially constant distance between them. The electrodes could be in a double spiral arrangement, or they could be a circular array of electrodes in a horizontal arrangement to form a sphere or a hemisphere. This device may be made with various numbers and shapes of electrodes. Other changes in size, color, materials, shape, form, function and manner of operation, assembly and use, are deemed readily apparent and do not depart from the scope of the present invention which is limited only by the following claims and their legal equivalents.

The invention claimed is:

1. A deer repelling and training device comprising a field unit having protective housing means and having attractant means, and having means to maintain a predetermined voltage across a plurality of bare, alternating positive and negative electrodes, and having support means to position said device in a protected area and to support said attractant means and said electrodes, and having said electrodes arranged so that said deer drawn by the scent of said attractant will touch said electrodes and will complete the circuit between said electrodes and so receive an electric shock;

and with the improvement comprising said deer repelling and training device having an improved configuration of said electrodes with said alternating positive and negative electrodes being substantially semicircular shaped and with said positive and negative electrodes being sized and spaced such that they are substantially parallel and have a substantially constant distance between them and form a substantially hemispherical shape which encloses said attractant means, whereby having said improved electrode configuration functions to provide an approximately even chance that said deer will make simultaneous contact with said positive and said negative electrodes, regardless of the angle or direction of said deer's approach, or of the size of said deer, and with said deer repelling and training device functioning to deter said deer from said protected area.

2. A method of repelling and training deer comprising the steps of:

(a) deploying a deer repelling and training device comprising a field unit having protective housing means and having attractant means and having means to maintain a predetermined voltage across a plurality of bare, alternating positive and negative electrodes, and having support means to position said device in a protected area and to support said attractant means and said electrodes, and having said electrodes arranged so that said deer drawn by the scent of said attractant will touch said electrodes and will complete the circuit between said electrodes and so receive an electric shock;

and with the improvement comprising said deer repelling and training device having an improved configuration of said electrodes with said alternating positive and negative electrodes being substantially semicircular shaped and with said positive and negative electrodes being sized and spaced such that they are substantially parallel and have a substantially constant distance between them and form a substantially hemispherical shape which encloses said attractant means, whereby having said improved electrode configuration functions to provide an approximately even chance that said deer will make simultaneous contact with said positive and said negative electrodes, regardless of the angle or direction of said deer's approach, or of the size of said deer, and with said deer repelling and training device functioning to deter said deer from said protected area, and (b) maintaining said deer repelling and training devices having said improved electrode configuration in said protected area to provide a scarecrow effect and so train said deer to continue to avoid said area.

* * * * *